United States Patent
van Hal

(10) Patent No.: US 8,925,529 B2
(45) Date of Patent: Jan. 6, 2015

(54) DEVICE FOR MIXING EXHAUST GAS WITH FRESH AIR TO BE RETURNED TO A COMBUSTION ENGINE

(75) Inventor: Martinus Nerius Maria Lucien van Hal, Maarheeze (NL)

(73) Assignee: Daf Trucks N.V. (NL)

( * ) Notice: Subject to any disclaimer, the term of this patent is extended or adjusted under 35 U.S.C. 154(b) by 376 days.

(21) Appl. No.: 13/188,643

(22) Filed: Jul. 22, 2011

(65) Prior Publication Data

US 2012/0017880 A1    Jan. 26, 2012

(30) Foreign Application Priority Data

Jul. 23, 2010 (NL) ..................................... 2005133

(51) Int. Cl.
  *F02B 47/08* (2006.01)
  *F02M 25/07* (2006.01)
  *F02M 35/10* (2006.01)

(52) U.S. Cl.
  CPC ... *F02M 35/10222* (2013.01); *F02M 35/10052* (2013.01); *F02M 25/0722* (2013.01); *Y02T 10/121* (2013.01)
  USPC .................................................. 123/568.17

(58) Field of Classification Search
  USPC ......................................... 123/568.11, 568.17
  See application file for complete search history.

(56) References Cited

U.S. PATENT DOCUMENTS

| | | | | |
|---|---|---|---|---|
| 6,237,336 B1 * | 5/2001 | Feucht et al. | ................ | 60/605.2 |
| 6,272,851 B1 * | 8/2001 | Mori et al. | ..................... | 60/278 |
| 6,446,617 B2 * | 9/2002 | Bianchi et al. | ........... | 123/568.17 |
| 6,609,374 B2 * | 8/2003 | Feucht et al. | ................... | 60/602 |
| 6,672,292 B2 * | 1/2004 | Fischer | ..................... | 123/568.17 |
| 7,036,493 B1 * | 5/2006 | Huebler et al. | .......... | 123/568.17 |
| 7,389,770 B2 * | 6/2008 | Bertilsson et al. | ....... | 123/568.17 |
| 7,568,340 B2 * | 8/2009 | Marsal et al. | ................ | 60/605.2 |
| 8,051,841 B2 | 11/2011 | Pantow et al. | | |
| 2001/0025632 A1 * | 10/2001 | Pietrowski et al. | ...... | 123/568.17 |
| 2010/0077996 A1 * | 4/2010 | Pantow et al. | ................ | 123/557 |
| 2012/0204845 A1 * | 8/2012 | Gingrich et al. | ......... | 123/568.17 |
| 2012/0216530 A1 * | 8/2012 | Flynn et al. | .................. | 60/605.2 |

FOREIGN PATENT DOCUMENTS

| | | |
|---|---|---|
| DE | 3916466 A1 | 11/1990 |
| DE | 10303569 A1 | 8/2004 |
| DE | 102008014168 A1 | 9/2008 |
| DE | 102007035556 A1 | 1/2009 |
| EP | 1533512 A2 | 5/2005 |
| EP | 2236804 A1 | 10/2010 |
| JP | H08144868 A | 6/1996 |
| WO | WO2007/130947 | 11/2007 |

OTHER PUBLICATIONS

Dutch Search Report—NL 2005133—Date of completion of search: May 19, 2011.
Extended European Search Report—EP 11174576.6—Mailing date: Oct. 10, 2014.

* cited by examiner

*Primary Examiner* — Hai Huynh
(74) *Attorney, Agent, or Firm* — Banner & Witcoff, Ltd.

(57) ABSTRACT

A device has an air inlet channel with at an end an inlet opening for fresh air and at the other end an outlet opening for a mixture of air and exhaust gas. A part of a wall of the air inlet channel is provided with mixing openings for supply of exhaust gas. The device further has an exhaust gas recirculation channel connected to the mixing openings and provided with an inlet opening for exhaust gas.

5 Claims, 1 Drawing Sheet

DEVICE FOR MIXING EXHAUST GAS WITH FRESH AIR TO BE RETURNED TO A COMBUSTION ENGINE

TECHNICAL FILED OF THE INVENTION

The invention relates to a device for mixing exhaust gas to be returned to a combustion engine with fresh air, comprising an air inlet channel with at an end an inlet opening for fresh air and at the other end an outlet opening for a mixture of air and exhaust gas, a part of a wall of the air inlet channel is provided with mixing openings for supply of exhaust gas, which device further comprises an exhaust gas recirculation channel connected to the mixing openings and provided with an inlet opening for exhaust gas.

BACKGROUND OF THE INVENTION

Such a device is known from WO-A-2007/130947. In this known device the exhaust gas recirculation channel is perpendicular to the air inlet channel and the mixing openings are distributed over the circumference of the air inlet channel.

SUMMARY OF THE INVENTION

It is an object of the present invention to provide a device of the type defined in the opening paragraph in which the mixing of the returned exhaust gas with fresh intake air is improved. To this end the device according to the invention is characterized in that over a part of its length the exhaust gas recirculation channel is in contact with the air inlet channel, over which part the exhaust gas recirculation channel is separated from the air inlet channel by the part of the wall provided with mixing openings, which mixing openings in the length direction of the channels are behind each other.

An embodiment of the device according to the invention in which the mixing of the returned exhaust gas with fresh air is further improved is characterized in that the other end of the exhaust gas recirculation channel is open and constitutes an outlet opening which is connected to one of the mixing openings, said end of the exhaust gas recirculation channel is continuously flowing to this mixing opening. By this smooth connection the exhaust gas is better guided into the fresh air flow so that a better mixing takes place.

A further embodiment of the device according to the invention in which the mixing of the returned exhaust gas with fresh air is still further improved is characterized in that the other end of the exhaust gas recirculation channel is near the inlet opening of the air inlet channel and the other mixing openings in the air inlet channel are in the part of the wall downstream of this end. The returned exhaust gas flows in the direction contrary to the direction of flow of fresh air so that a still better mixing takes place.

BRIEF DESCRIPTION OF THE DRAWINGS

The invention will be further elucidated below with reference to an embodiment of the device according to the invention given in drawing figures. In these drawings

DETAILED DESCRIPTION OF THE DRAWINGS

Figure 1:
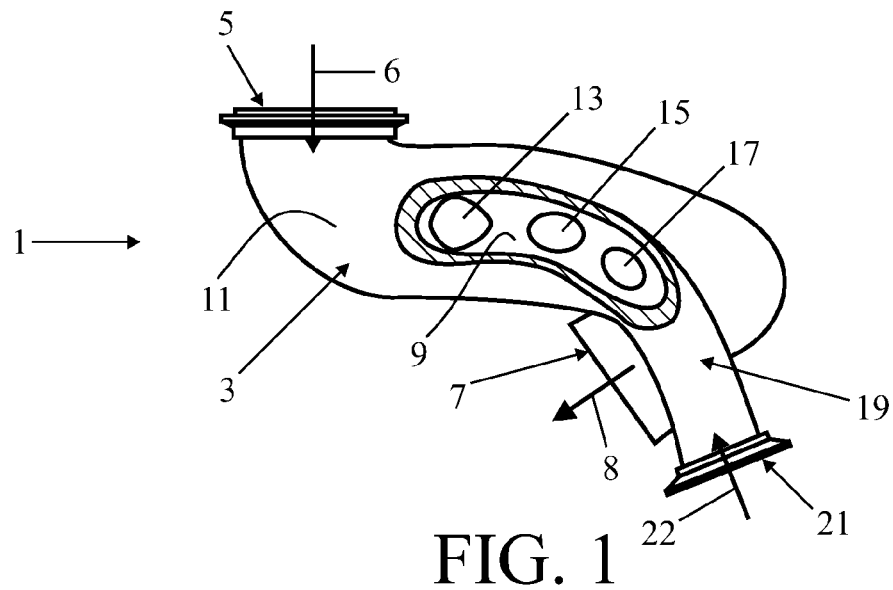
FIGS. 1, 2 and 3 are perspective views from different angles showing the device partly cut-out.
Figure 2:
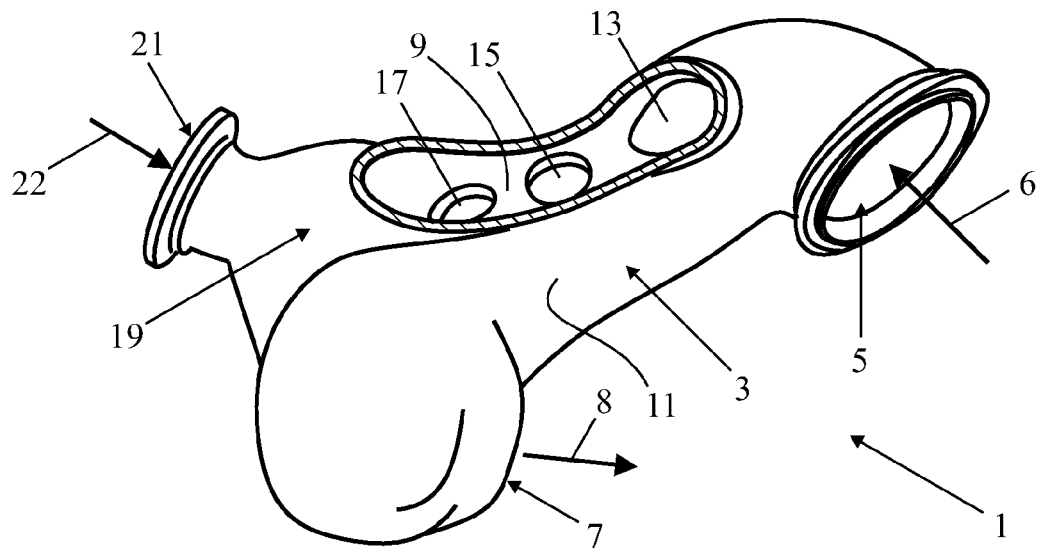
Figure 3:
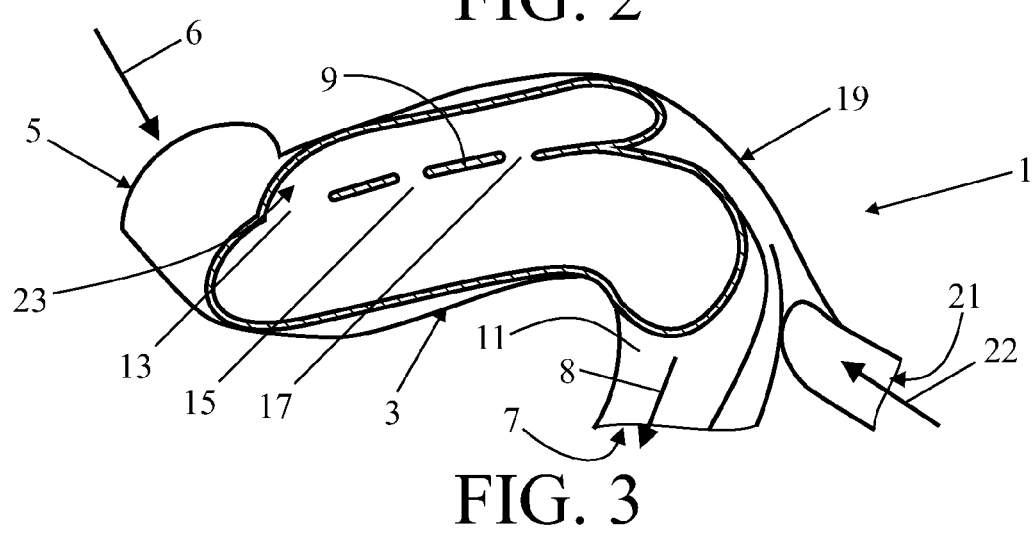

In FIGS. 1, 2 and 3 the device for mixing exhaust gas to be returned to a combustion engine with fresh air is shown. The device is partly cut-out to clearly show the internal construction. The device 1 has an air inlet channel 3 with at an end an inlet opening 5 for fresh air 6 and at the other end an outlet opening 7 for a mixture of air and exhaust gas 8. A part 9 of a wall 11 of the air inlet channel is provided with mixing openings 13, 15, 17 for supply of exhaust gas.

The device 1 further comprises an exhaust gas recirculation channel 19 connected to the mixing openings and provided with an inlet opening 21 for exhaust gas 22. The exhaust gas recirculation channel is over a part of its length in contact with the air inlet channel 3. Over this part the exhaust gas recirculation channel 19 is separated from the air inlet channel 3 by the part 9 of the wall provided with mixing openings 13-17. In the length direction of the channels the mixing openings are behind each other. The other end of the exhaust gas recirculation channel 19 is open and constitutes an outlet opening 23 (see FIG. 3) which is connected to one of the mixing openings 13. This outlet opening 23 is continuously flowing to this mixing opening 13 and is present near the inlet opening 5 of the air inlet channel 3. The other mixing openings 15 and 17 are in the part 9 of the wall downstream of the air inlet channel.

Albeit the invention has been described in the foregoing with reference to the drawings, it should be pointed out that the invention is not by any manner or means restricted to the embodiments shown in the drawings. The invention also extends over any embodiment deviating from the embodiment shown in the drawing Figures within the scope defined by the claims.

What is claimed is:

1. A device for mixing exhaust gas to be returned to a combustion engine with fresh air, the device comprising:
   a substantially elongate air inlet channel provided at one end with an air inlet opening for fresh air and at an opposite end with a mixture outlet opening for a mixture of air and exhaust gas;
   a part of a wall of the air inlet channel is provided with a plurality of mixing openings for supply of exhaust gas;
   a substantially elongate exhaust gas recirculation channel flowingly connected to the plurality of mixing openings and provided at one end with an exhaust gas inlet opening for exhaust gas;
   wherein over a part of its length the exhaust gas recirculation channel is in lengthwise contact with the air inlet channel, over which part of its length the exhaust gas recirculation channel is separated from the air inlet channel by the part of the wall provided with the plurality of mixing openings, which mixing openings in a common length direction of the air inlet and exhaust gas recirculation channels are behind each other; and
   wherein the air inlet opening and the exhaust gas inlet opening are so arranged that, in use, returned exhaust gas in the exhaust gas recirculation channel flows in a direction opposite to a flow of fresh air in the air inlet channel.

2. A device according to claim 1, wherein an opposite end of the exhaust gas recirculation channel is open and constitutes an outlet opening which is connected to a first one of the mixing openings, said other end of the exhaust gas recirculation channel is adapted for continuously flowing to this first one mixing opening.

3. A device according to claim 1, wherein an opposite end of the exhaust gas recirculation channel is near the air inlet opening of the air inlet channel and the other of the plurality of mixing openings in the air inlet channel are in the part of the wall downstream of the air inlet opening of the air inlet channel.

4. A device according to claim 1, wherein an opposite end of the exhaust gas recirculation channel constitutes an outlet opening which is connected to a first one of the mixing openings, the other end of the exhaust gas recirculation channel is adapted for continuously flowing to this first one mixing opening, and wherein the opposite end of the exhaust gas recirculation channel is near the air inlet opening of the air inlet channel and the other of the plurality of mixing openings are positioned downstream of the air inlet opening of the air inlet channel.

5. A device for mixing exhaust gas to be returned to a combustion engine with fresh air, the device comprising:
- an elongate air inlet channel having opposite ends with an inlet opening for fresh air at one of its opposite ends and an outlet opening for a mixture of air and exhaust gas at the other of its opposite end;
- a part of a wall of the air inlet channel is provided with mixing openings for supply of exhaust gas;
- an elongate exhaust gas recirculation channel connected to the mixing openings and provided with an inlet opening for exhaust gas;
- wherein the exhaust gas recirculation channel over a part of its length is in contact with the air inlet channel, over which part of its length the exhaust gas recirculation channel is separated from the air inlet channel by the part of the wall provided with the mixing openings, which mixing openings in a common length direction of the air inlet and exhaust gas recirculation channels are behind each other; and
- wherein a end of the exhaust gas recirculation channel opposite to the inlet opening for exhaust gas is open and constitutes an outlet opening which is connected to one of the mixing openings, said end of the exhaust gas recirculation channel is arranged for continuously flowing of returned exhaust gas to this one mixing opening; and
- wherein the air inlet opening and the exhaust gas inlet opening are so arranged that, in use, returned exhaust gas in the exhaust gas recirculation channel flows in a direction opposite to a flow of fresh air in the air inlet channel.

* * * * *